(12) United States Patent
Yi

(10) Patent No.: US 9,094,729 B2
(45) Date of Patent: *Jul. 28, 2015

(54) EXPANDED PLAYLIST FOR TV VIDEO PLAYER

(71) Applicants: SONY CORPORATION, Tokyo (JP); SONY ELECTRONICS INC., Park Ridge, NJ (US)

(72) Inventor: Hye Hoon Yi, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,010

(22) Filed: Jun. 26, 2014

(65) Prior Publication Data

US 2014/0310747 A1 Oct. 16, 2014

Related U.S. Application Data

(60) Continuation of application No. 13/405,711, filed on Feb. 27, 2012, now Pat. No. 8,813,129, which is a continuation of application No. 12/436,319, filed on May 6, 2009, now Pat. No. 8,176,514, which is a division of application No. 12/020,184, filed on Jan. 25, 2008, now abandoned.

(51) Int. Cl.
| | |
|---|---|
| H04N 5/445 | (2011.01) |
| H04N 21/482 | (2011.01) |
| H04N 21/462 | (2011.01) |
| H04N 21/61 | (2011.01) |
| H04N 21/431 | (2011.01) |

(52) U.S. Cl.
CPC ......... *H04N 21/482* (2013.01); *H04N 5/44543* (2013.01); *H04N 5/44591* (2013.01); *H04N 21/431* (2013.01); *H04N 21/4622* (2013.01); *H04N 21/4821* (2013.01); *H04N 21/6125* (2013.01); *H04N 21/6175* (2013.01)

(58) Field of Classification Search
CPC ............ H04N 21/431; H04N 21/4312; H04N 21/4314; H04N 21/4316
USPC ................................................ 725/41, 52, 53
See application file for complete search history.

(56) References Cited

U.S. PATENT DOCUMENTS

| | | | |
|---|---|---|---|
| 6,177,931 B1 * | 1/2001 | Alexander et al. | 725/52 |
| 7,805,677 B2 * | 9/2010 | Takakuwa et al. | 715/716 |
| 8,069,414 B2 * | 11/2011 | Hartwig et al. | 715/719 |
| 8,176,514 B2 * | 5/2012 | Yi | 725/41 |
| 8,544,044 B2 * | 9/2013 | Friedlander et al. | 725/51 |
| 8,813,129 B2 * | 8/2014 | Yi | 725/41 |
| 2003/0093790 A1 * | 5/2003 | Logan et al. | 725/38 |
| 2005/0060229 A1 * | 3/2005 | Riedl et al. | 705/14 |
| 2005/0071871 A1 * | 3/2005 | Yuzawa | 725/48 |
| 2005/0204385 A1 * | 9/2005 | Sull et al. | 725/45 |
| 2006/0149761 A1 * | 7/2006 | Kim et al. | 707/100 |
| 2006/0225097 A1 * | 10/2006 | Lawrence-Apfelbaum | 725/61 |
| 2007/0081669 A1 * | 4/2007 | Takashima et al. | 380/212 |
| 2007/0107015 A1 * | 5/2007 | Kazama et al. | 725/58 |
| 2008/0007616 A1 * | 1/2008 | Baladhandayuthapani | 348/14.12 |

(Continued)

*Primary Examiner* — James R Sheleheda
(74) *Attorney, Agent, or Firm* — John L. Rogitz

(57) ABSTRACT

An Internet TV video guide shows thumbnails of video assets available from one or more providers, and one or more of the assets may represent a playlist with two or more associated video clips. When a viewer selects a playlist asset, the thumbnail is expanded to show the individual clips so that a viewer can select a desired clip for play on the TV.

14 Claims, 3 Drawing Sheets

(56) References Cited

U.S. PATENT DOCUMENTS

| | | | |
|---|---|---|---|
| 2008/0046928 A1* | 2/2008 | Poling et al. | 725/40 |
| 2008/0148152 A1* | 6/2008 | Blinnikka et al. | 715/719 |
| 2010/0017823 A1* | 1/2010 | Van De Sluis et al. | 725/46 |
| 2010/0257561 A1* | 10/2010 | Maissel et al. | 725/41 |

* cited by examiner

US 9,094,729 B2

EXPANDED PLAYLIST FOR TV VIDEO PLAYER

FIELD OF THE INVENTION

The present invention relates generally to players used for conveying Internet video to TVs for display thereof, and to expanding playlists related to such players.

BACKGROUND OF THE INVENTION

Televisions have become increasingly advanced, providing viewers with ever more control and viewing options. As but one example, electronic program guides (EPG) can be displayed on a TV in response to a command generated by a remote control device, with the EPG showing a channel listing and show descriptions. As another example, a video player for providing Internet video for display on a TV can be provided, and these players typically involve additional control features and functionalities.

Additional TV features and functions may also be provided, and as understood herein, many if not most of these features and functions entail presenting a user interface on screen to enable a viewer to select or control the feature or function. As also understood herein, owing to the growing number of such features and functions and the operational complexity that can attend to managing them, the user interfaces preferably are displayed in an intuitive, easy to understand format that keeps screen clutter and, hence, viewer confusion to a minimum.

SUMMARY OF THE INVENTION

A method includes receiving, at a TV, signals from the Internet, and based on the signals, presenting on the TV a video guide. The video guide includes plural graphic entities such as thumbnails, with each entity being associated with a respective video asset provided over the Internet. One of the video assets is a playlist that includes two or more video clips, and the graphic entity associated with the playlist displays the titles of the clips.

In some implementations the titles are displayed when a viewer selects the graphic entity associated with the playlist. In other implementations the titles are displayed when a viewer hovers a screen cursor over the graphic entity associated with the playlist.

The method may also include receiving a user selection of a graphic entity and in response downloading the respective video asset from the Internet and playing the respective video asset. The method can also include receiving a user selection of a clip on the graphic entity representing the playlist and in response downloading the clip from the Internet and playing the clip. The graphic entities can be arranged in a single row in a bottom portion of a TV display.

In another aspect, a TV system includes a TV, a TV processor in the TV, and a TV display associated with the TV and configured for communicating with the TV processor. The system further includes an Internet adapter configured for communicating with the TV using at least a high definition multimedia interface (HDMI) communication path. The Internet adapter is configured to receive signals from the Internet. An adapter processor is in the adapter. The TV processor and/or the adapter processor is configured for causing a video guide to be displayed on the TV display. The video guide presents plural thumbnails each being associated with a respective video asset on the Internet and each being selectable to cause the associated video asset to be played on the TV display. One or more thumbnails represent a playlist and lists two or more titles of clips in the playlist.

In yet another aspect, a TV includes a TV processor in a TV housing and a TV display associated with the TV and configured for communicating with the TV processor. An Internet adapter that is configured for communicating with the TV using a HDMI communication path can receive signals from the Internet and provide the signals to the TV processor. The TV processor is configured for causing a video guide to be displayed on the TV display. The video guide includes plural graphic entities each associated with a respective video asset provided over the Internet from the adapter, and at least one video asset is a playlist of at least two video clips. The graphic entity associated with the playlist displays the titles of the clips.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
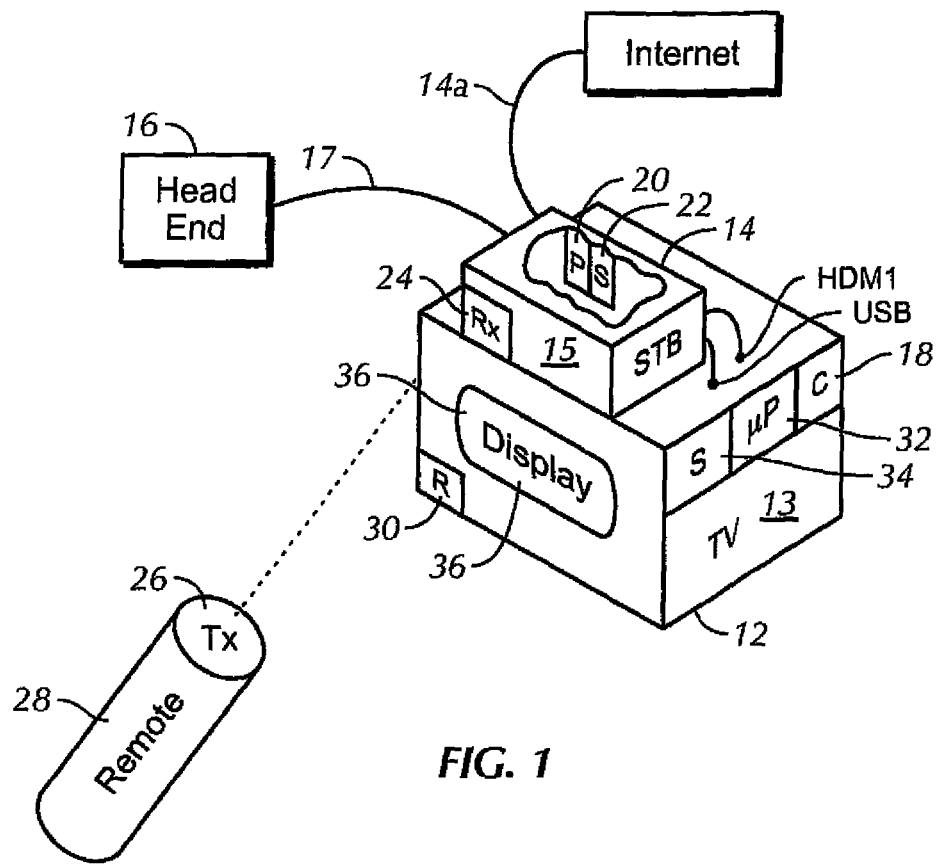
FIG. 1 is a non-limiting hardware block diagram of a system in accordance with present principles, with portions of the STB and TV cut away for clarity.

Referring initially to FIG. 1, a system is shown, generally designated 10, which includes a television 12 defining a TV chassis 13 and receiving, via a set-top box (STB) 14 defining a STB housing 15, audio video TV programming from a head-end 16, such as a cable or satellite head-end, over a wired or wireless link 17. The STB 14 and TV 12 are examples of receivers. "Set-top box" also includes set-back boxes. While the STB 14 is shown separately housed from the chassis 18 of the TV 12, it is to be understood that the functionality of the STB 14 may be incorporated into the chassis 18.

In any case, the STB 14 may be connected to the TV 12 by both a high definition multimedia interface (HDMI) connector "HDMI" and by a universal serial bus (USB) connector "USB". The STB 14 may also be connected to the Internet as shown via a wired or wireless communication path 14a. In one implementation the path 14a includes an Ethernet cable. The STB 14 conveys video programs from Internet sites to the TV 12 for display of the video programs on the TV 12 as described further below.

As shown, the STB 14 includes a STB processor 20 and a tangible computer readable medium 22 such as volatile or non-volatile solid state storage, disk storage, tape storage, or other type of electronic storage medium or logic circuitry that typically can be executed by the processor 20. The STB 14 typically includes a wireless receiver such as an infrared (IR) receiver 24 for receiving channel, volume, and other commands from a hand-held wireless transceiver 26 on a TV remote control 28. The receiver 24 communicates with the STB processor 20. Likewise, a TV wireless receiver 30 may be provided on the TV housing and may communicate with the TV processor discussed below for sending commands from the remote control 28 to the TV processor.

Additionally, as shown the TV 12 typically includes a TV processor 32 and tangible computer readable medium 34. Video as well as the below-described user interfaces may be presented on a display 36 of the TV 12, e.g., a flat panel matrix display, cathode ray tube, or other appropriate video display.

Either one or both of the above-described processors may execute instructions stored in either one or both of the above-described tangible computer readable media to undertake logic below. The tangible computer readable media may be established by, without limitation, solid state storage, optical or hard disk storage, tape storage, etc.

Figure 2:
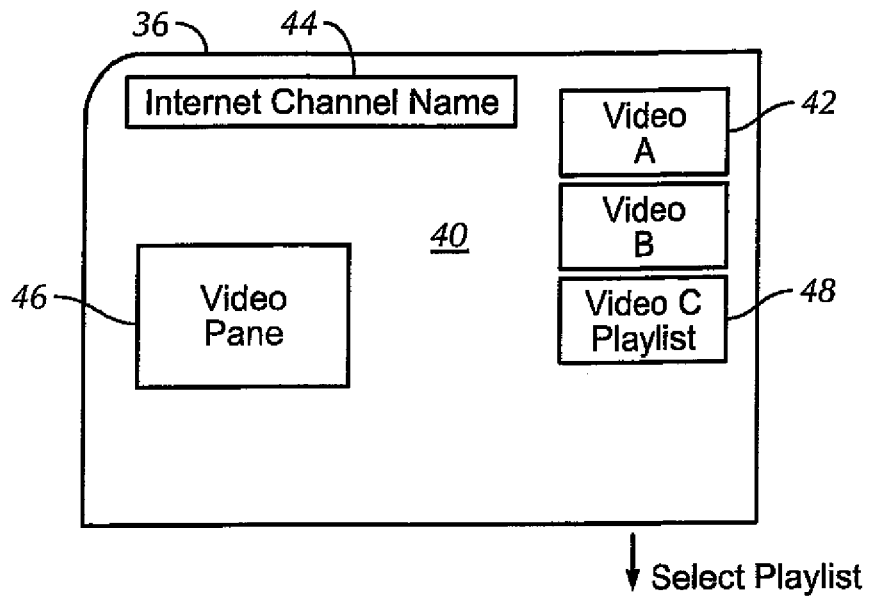
FIG. 2 is a screen shot showing an Internet TV video guide in accordance with one embodiment.

Now referring to FIG. 2, when the STB 14 is connected as intended to the TV 12, a video guide 40 appears automatically or in response to a user manipulating a key on the remote control 28 such as a "guide" or "menu" key. The video guide 40 shows thumbnails and/or titles 42 of respective Internet video streams that may be provided through the STB 14 to the TV 12 via, e.g., the above-described HDMI path for display of the Internet videos on the TV 12. Videos from all available video providers may be represented by thumbnails 42. In FIG. 2, for ease of disclosure a single video provider is indicated at 44. If desired, a video pane 46 may also be presented on the video guide 40 to display a currently tuned-to TV or Internet video.

Typically, each thumbnail 42 represents a single respective video stream, and a viewer can place a cursor over a desired thumbnail and select it to cause the associated video stream to be played on the TV 12. However, as intended herein an Internet video provider may elect to provide a video asset that itself consists of two or more video streams, referred to herein for clarity as "clips", in a playlist format. Such an asset is shown at 48 in FIG. 2, indicating that the asset is a playlist of plural clips as shown. In this way, an Internet video provider can bundle multiple video clips under one title, with the set of videos appearing on the video guide as one entity to, e.g., support advertisement insertion.

Figure 3:
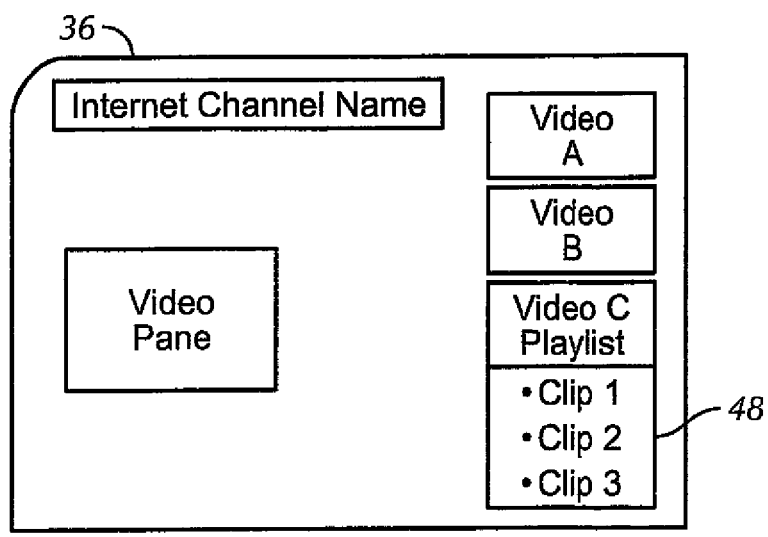
FIG. 3 is a screen shot showing the Internet TV video guide of FIG. 2 after a viewer has selected a playlist asset, showing the playlist expanded.

Accordingly, should a viewer use the remote control 28 to select the playlist thumbnail 48 (by, e.g., hovering the screen cursor over it), the display can change to that shown in FIG. 3, wherein the playlist thumbnail 48 is expanded to list the clips within the playlist. The viewer may then select a user-desired one of the clips for play, thereby avoiding the necessity of having to play the clips in a predetermined order. However, as described further below the viewer may be able to select playback modes such as play all, repeat and shuffle.

Figure 4:
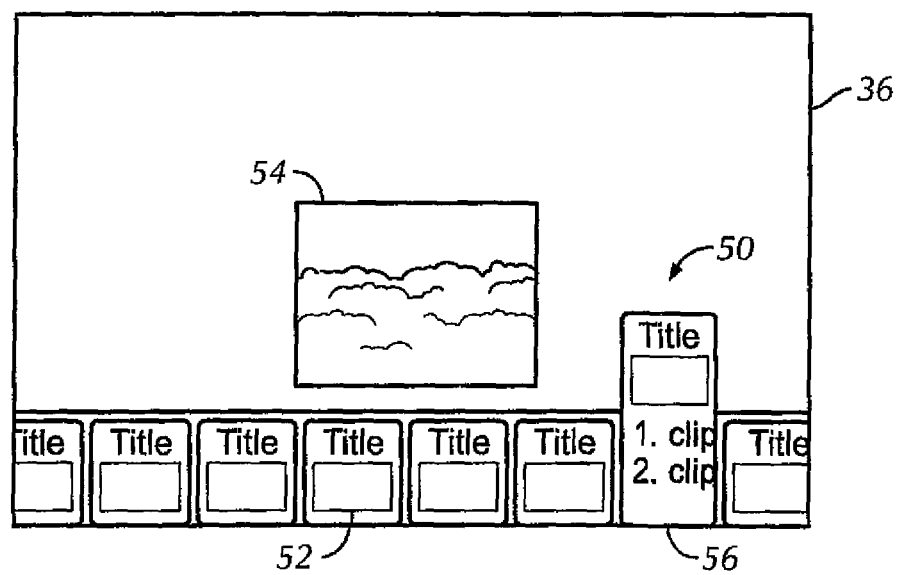
FIG. 4 is a screen shot showing an Internet TV video guide in accordance with another embodiment after a viewer has selected a playlist asset, showing the playlist expanded.

Referring briefly to FIG. 4, an alternate video guide 50 is shown in which Internet video assets are represented by respective thumbnails 52 in a single row near, e.g., the bottom of the display 36, under a current video pane 54. As shown at 56, should a thumbnail represent a playlist consisting of plural clips, the clip titles are listed in the thumbnail for selection of an individual clip by a viewer. The clips titles may be presented initially and automatically on the video guide 50 or may appear only in response to, e.g., a viewer hovering a screen cursor over the playlist thumbnail.

Figure 5:
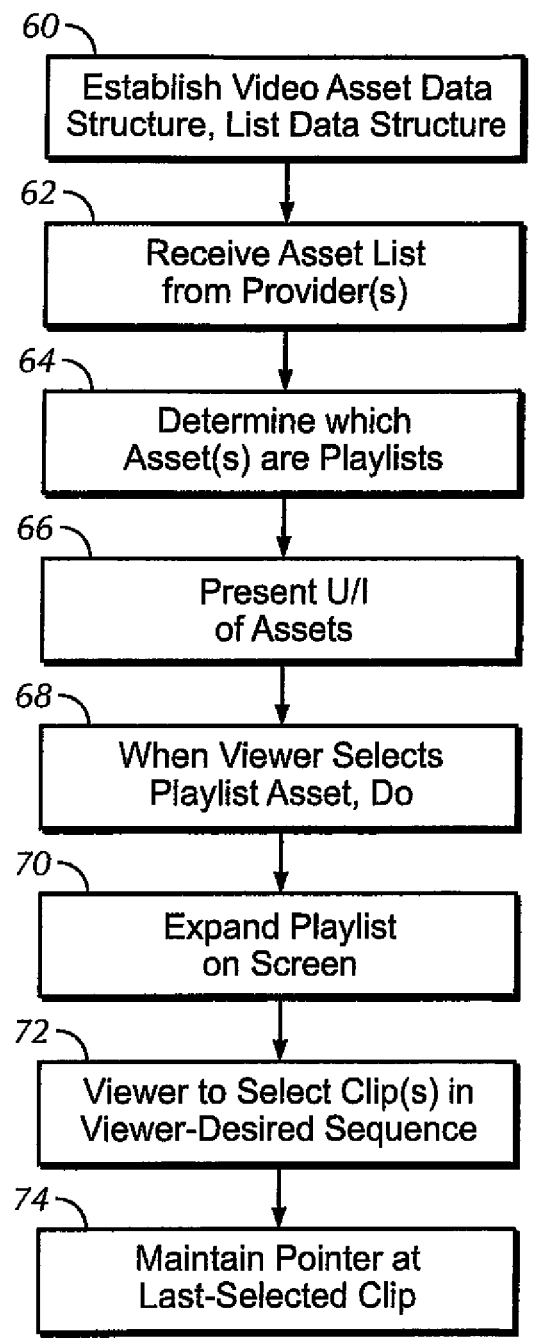
FIG. 5 is a flow chart of non-limiting logic associated with the screen shots described herein.

Now referring to FIG. 5, commencing at block 60 a video asset data structure and a playlist data structure are established. Each video asset from an Internet video provider, including each playlist, is established as a single entity in the video asset data structure. In contrast, for an asset designated as being a playlist, it is associated with a playlist data structure in which each clip of the playlist is established as being a single entity.

When a list of video assets is received from an Internet video provider at block 62, it is determined which of the assets are playlists at block 64. This determination may be made by, e.g., scanning video header information in the list for title fields, with two or more title fields being inferred to indicate a playlist and with the titles inferred to indicate the names of the clips in the playlists. Or, a video provider may append or set a predetermined "playlist" flag on an asset that represents a playlist to in effect explicitly tell the STB 14/TV 12 that an asset is a playlist.

Proceeding from block 64 to block 66, a video guide is presented on the TV display 36 in accordance with principles above, showing thumbnails of available Internet videos. In the event that a viewer selects a playlist asset at block 68 (alternatively, as indicated above automatically), the playlist thumbnail is expanded at block 70 to show, e.g., an expanded video guide of FIG. 3, in which the individual clips of the playlist are displayed for selection thereof by a viewer. The viewer can then select to play a clip or clips in the playlist using the expanded thumbnail in any order desired by the viewer.

Also, as mentioned above a "play all" and/or "play randomly" selector may be displayed on the TV display 36 to enable a viewer to cause all clips in the playlist to be played in sequence or in a random order, respectively. The logic may conclude at block 74, where, when the viewer has finished playing clips in the playlist, a pointer can be maintained at the last-played clip or at the next clip in the sequence so that upon subsequent invocation of the playlist thumbnail, play is resumed at the pointed-to clip.

While the particular EXPANDED PLAYLIST FOR TV VIDEO PLAYER is herein shown and described in detail, it is to be understood that the subject matter which is encompassed by the present invention is limited only by the claims.

What is claimed is:

1. A system comprising;
    at least one computer memory that is not a transitory signal and that comprises instructions executable by at least one processor for:
    outputting a video guide to be displayed on a video display, the video guide presenting plural graphics entities each being associated with a respective video asset on the Internet and each being selectable to cause at least a portion of the associated video asset to be played on the video display, at least a first graphic entity representing a first video asset determined by the processor to represent playlist of plural clips having respective tides at least in part based on determining that a flag in a data structure describing the first video asset contains a flag indicating the first video as is a playlist, wherein the graphic entity representing the playlist is presented in at least one configuration on the video display in which titles of playlist clips are presented in the graphic entity representing the playlist.

2. The system of claim 1, wherein the instructions are executable to present titles responsive to a viewer selecting the graphic entity associated with the playlist.

3. The system of claim 1, wherein the instructions are executable to present titles responsive to a viewer hovering a screen cursor over the graphic entity associated with the playlist.

4. The system of claim 1, wherein the graphic entities are derived from the respective video assets.

5. The system of claim 1, wherein the instructions are executable to present the graphic entities in at least one row in a bottom portion of the display, the instructions being executable to present the graphic entity representing the playlist in a second configuration such that at least a portion of it extends upward beyond each top-most portion of graphic entities in the row not representing playlists to thereby provide additional area within the graphic entity representing the playlist for presenting information.

6. The system of claim 1, comprising the at least one processor.

7. A device comprising:
   at least one computer memory that is not a transitory signal and that comprises instructions executable by at least one processor for:
   determining that at least a first video asset includes a playlist of plural dips having respective titles at least in part based on determining that two or more tide fields exist in a data structure describing the first video asset, and/or by determining that a flag in a data structure describing the first video asset contains a flag indicating that the first video asset is a playlist,
   causing a video guide including a graphic entity representing the first video asset to be displayed on a video display, the video guide including plural graphic entities each associated with a respective video asset provided over a network.

8. The device of claim 7, comprising the at least one processor.

9. The device of claim 7, wherein the instructions are executable to display titles responsive to a viewer selecting the graphic entity associated with the playlist.

10. The device of claim 7, wherein the instructions are executable to display titles responsive to a viewer hovering a screen cursor over the graphic entity associated with the playlist.

11. The device of claim 7, wherein the graphic entities include thumbnail images derived from the respective video assets.

12. The device of claim 7, wherein the instructions are executable to receive a user selection of a graphic entity and in response play the respective video asset.

13. The device of claim 7, wherein the instructions are executable to arrange graphic entities in at least one row in a bottom portion of the display.

14. The device of claim 7, wherein the instructions are executable to receive a user selection of a clip on the graphic entity representing the playlist and in response play the chip.

* * * * *